Figures 1, 2, 3:
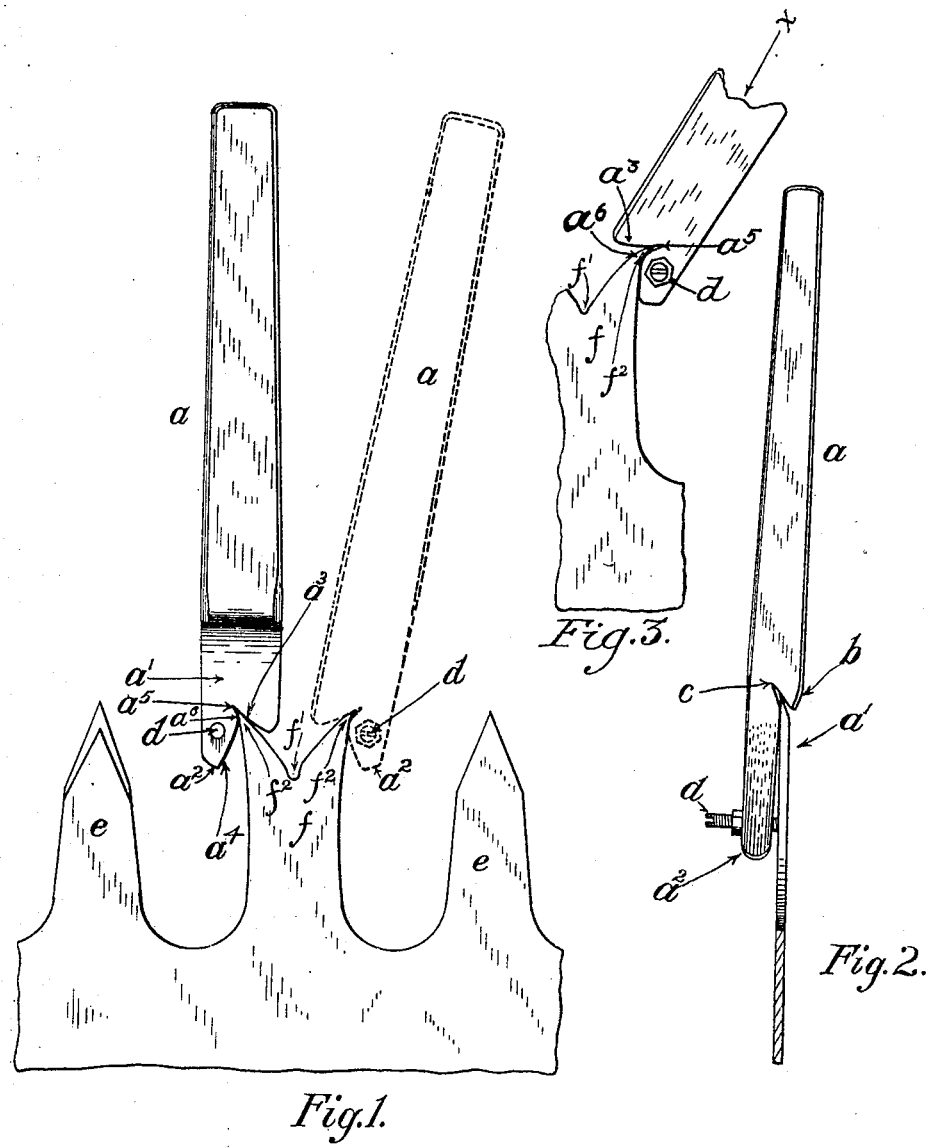

No. 885,389. PATENTED APR. 21, 1908.
M. E. SIMMONS.
SAW TOOTH TOOL.
APPLICATION FILED OCT. 19, 1906.

WITNESSES:
A. D. Gerking.
Cecil Long.

INVENTOR:
Moses E. Simmons
by F. Geisler
Atty.

UNITED STATES PATENT OFFICE.

MOSES E. SIMMONS, OF PORTLAND, OREGON.

SAW-TOOTH TOOL.

No. 885,389.

Specification of Letters Patent.

Patented April 21, 1908.

Application filed October 19, 1906. Serial No. 339,728.

*To all whom it may concern:*

Be it known that I, MOSES E. SIMMONS, a citizen of the United States, and a resident of Portland, in the county of Multnomah and State of Oregon, have invented a new and useful Improvement in Saw-Tooth Tools, of which the following is a specification, reference being had to the accompanying drawings as constituting a part thereof.

This invention has for its object to provide a single tool or implement whereby the cutting teeth of a saw may be properly and conveniently set, and the points of the drag teeth properly turned; and to this end my tool is of the construction and embodies the features hereinafter particularly set forth and claimed.

In the drawings: Figure 1 represents a section of a cross-cut saw with my improved tool in position to turn one of the points of a drag tooth; the dotted outline of my tool in this view also showing the manipulation of the same in the act of so turning one of the points of a drag tooth; Fig. 2 is a transverse section of a cross-cut saw immediately in front of one of the cutting teeth thereof; and Fig. 3 shows one of the points or members of a drag tooth, with my tool applied thereto as in practice, in the process of finishing said point.

Referring now to the letters as designating the parts described: My tool comprises a straight body or shank portion $a$, one side of the lower portion $a'$ of which is cut away, and the base of the cut-away portion is beveled inwardly at $b$, and also formed with a recess $c$, tapering to a sharp point as observable from Fig. 2. This part of my device is designed to provide the means for properly spreading or swaging the points of the cutter teeth. In use the tool would be applied to spread the alternating teeth in opposite directions as usually done. Near the bottom of the projecting piece $a^2$, I provide a set-screw $d$, to enable the tool to be properly applied as illustrated in Fig. 2, for the purpose of giving the desired set to the cutter teeth.

The projecting portion $a^2$ is itself partly cut away as shown in Fig. 1, to adapt the tool to be used for turning the points of the raker or drag teeth. To this end the surface $a^3$ of such cut-away portion is slightly convexed, and the lower surface $a^4$ is made on a straight line which intersects the surface line $a^3$ approximately at a right angle, and the apex of the recess $a^5$, formed at the point of the intersection of the surface lines $a^3$ and $a^4$, tapers wedge-shape to a point.

$e, e,$ represent the usual cutting teeth, and $f$ an intermediate raker or drag tooth.

When first applying my tool to turn the points of a drag tooth the same will be set upon the point as illustrated in Fig. 1. The convexed face $a^3$ will bear only upon a small portion of the point $f^2$ at a time, while the shoulder $a^6$ in the tool will bear against the under side of such point. And it is to be noted that the recess $a^5$ is so formed as to give the point $f^2$ the proper outward turn.

While finishing the turning of a point $f^2$ the face $a^4$ of the tool will gradually be brought towards and finally will bear against the lateral edge of the tooth as shown in Fig. 3, thus providing an absolute guide for the proper forming of the points $f^2$, and preventing the same being formed otherwise than they ought to be. For when the tool is set in the position shown in Fig. 3, the blows of the taps of the hammer will approximately be directed as indicated by the dotted line $x$ in Fig. 3, against the lateral edge of the body of the tooth $f$. Furthermore the part $a^2$ of the tool is so arranged and proportioned as not to strike the throat $f'$ of the drag tooth.

The described constructions of the parts of my tool are essential to its operation as set forth.

I claim:

A saw tool, consisting of a shank having a downward extension the extremity of which is divided into two sections of unequal length by a wedge-shape recess, a straight surface $a^4$ and shoulder $a^6$ formed on the longer of said sections, and a convexed surface $a^3$ formed on the shorter thereof, said surfaces $a^4$, $a^3$ intersecting each other at approximately right angles and thence curving to form the apex $a^5$ of said recess, substantially as described.

MOSES E. SIMMONS.

Witnesses:
T. J. GEISLER,
O. H. SCHOCK.